Patented Mar. 14, 1944

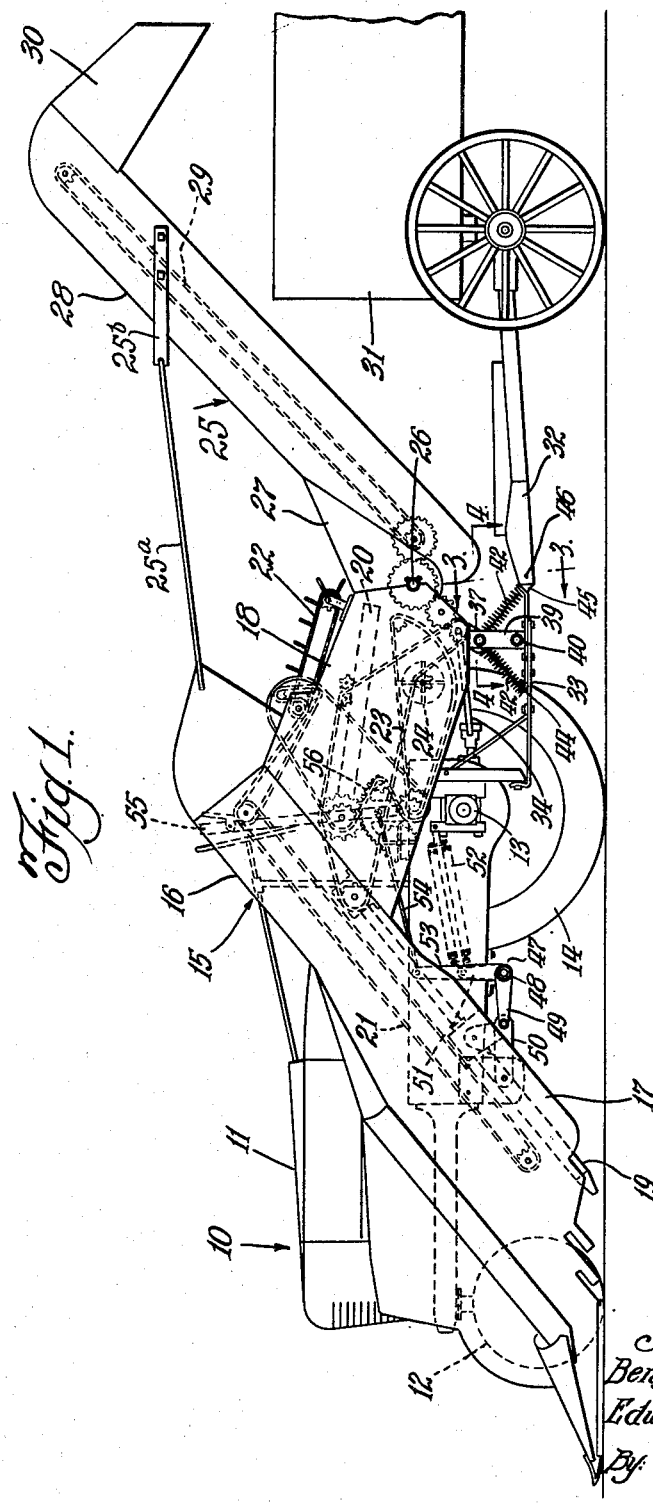

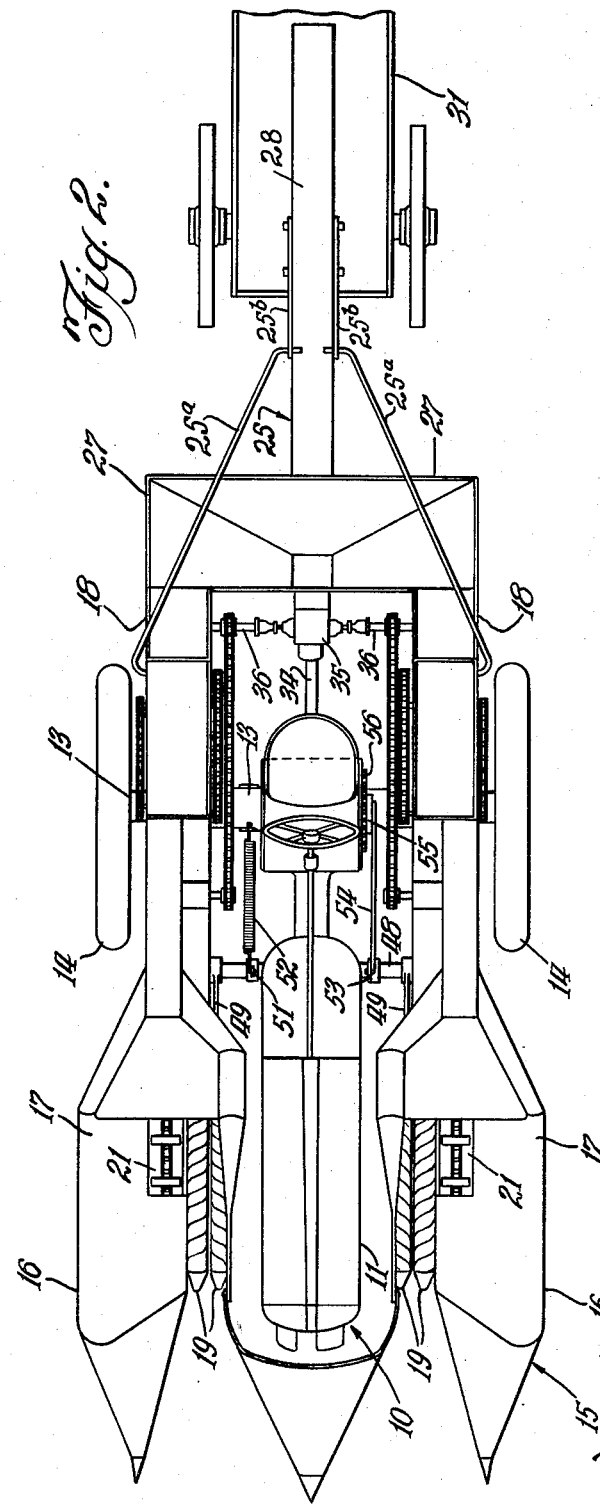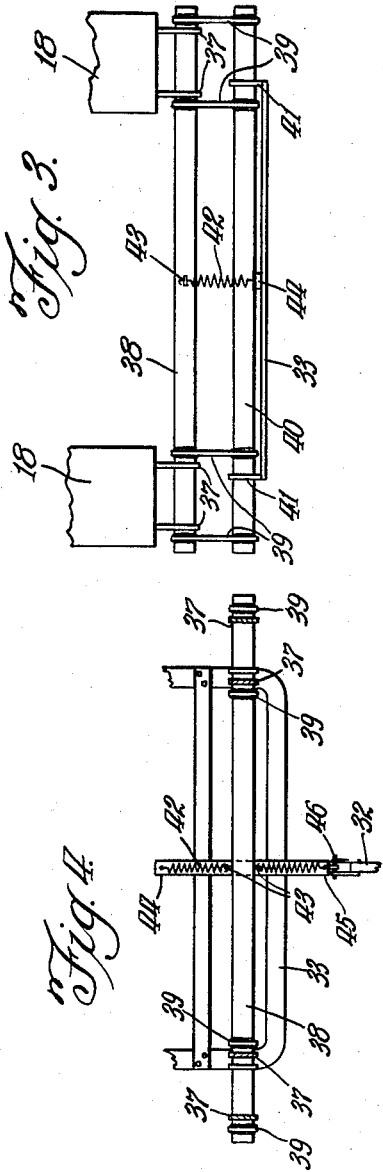

2,344,305

UNITED STATES PATENT OFFICE 2,344,305

CORN PICKER

Benjamin M. Hyman, Moline, and Edward M. Melin, Chicago, Ill., assignors to International Harvester Company, a corporation of New Jersey Application July 21, 1941, Serial No. 403,322

5 Claims. (Cl. 56—18)

This invention relates to a tractor-mounted harvester. More specifically it relates to the mounting of a tractor-mounted corn harvester.

The mounting of a harvester such as a corn picker upon a tractor necessarily presents many problems, since the harvester is large and heavy and must be capable of attachment to and detachment from the tractor without too much effort so that the tractor may be available for other uses.

An object of the present invention is to provide an improved mounting for a harvester.

Another object is the provision of an improved mounting for a harvester upon a tractor.

A further object is to provide an improved mounting for a corn picker upon a tractor.

According to the present invention, a corn picker comprising rigidly attached snapping and husking units is positioned alongside a tractor so as to extend over the rear axle thereof and is connected at its rear end to the tractor to the rear of the rear axle by a rock-shaft and arm and at an intermediate point to a point on the tractor in front of the rear axle by a rock-shaft and arm.

In the drawings:

Figure 1 is a side view of a tractor and a corn picker mounted thereon;

Figure 2 is a plan view of the structure shown in Figure 1;

Figure 3 is a detail view partly in section taken along the line 3—3 of Figure 1; and Figure 4 is a detail view partly in section taken along the line 4—4 of Figure 1.

The reference character 10 designates a tractor 10 having a narrow body 11, a narrow front rolling support 12, an extended rear axle 13, and rear wheels 14. Mounted upon the tractor is a corn harvester 15 comprising corn harvester units 16 positioned at each side of the narrow tractor body 11 and extending over the rear axle 13. Each corn harvester unit 16 comprises a snapping unit 17 and a husking unit 18 rigidly attached to one another. Each snapping unit 17 includes snapping rolls 19, and each husking unit 18, husking rolls 20. In each harvester unit 16 there is an ear elevator 21 for conveying ears of corn from the snapping rolls 19 to the husking rolls. In each husking unit 18 there is an ear forwarder 22 over the husking rolls 20, a husk conveyer 23 beneath the husking rolls 20, and a fan 24 within the husk conveyer 23. A wagon elevator unit 25 is pivotally supported at 26 in the rear of the husking units 18 and includes gravity chutes 27, an elevator housing 28, an elevator conveyer 29 within the housing 28, and a discharge spout 30. The discharge spout 30 is over a wagon 31 connected by a foldable tongue 32 to a draw-bar structure 33 secured to the rear of the tractor rear axle 13. The upper end of the wagon elevator unit 25 is held up by members 25a connected at one end to members 25b secured to the wagon elevator and at the other end to the husking units 18. The harvester units 16 and the wagon elevator unit 25 are substantially as shown in the patent to Hyman et al., No. 2,255,168, September 9, 1941, and for this reason and the reason that the units themselves form no part of the present invention, no further description is given of the units nor of the drawing mechanism therefor. It is sufficient to state that the drive of the units originates with a power take-off shaft 34 at the rear of the tractor and passes from there through a gear box 35 and a transverse shaft 36 extending to the rear end of the husking units 18.

As shown in Figures 3 and 4, brackets 37 at the lower rear end of the husking units 18 are journaled on a transverse member 38 supported on arms 39 secured to a rock-shaft 40 journaled on brackets 41 secured to the draw-bar structure 33 which serves as a supporting structure for the rear of the harvesting units 16. Thus the rear ends of the harvester units may move from the position of Figure 1 both forwardly and downwardly, and rearwardly and downwardly by virtue of the permissible rocking movement of the rock-shaft and the arms 39 secured thereto. However, movement of the harvester units in either direction from the position of Figure 1 is resisted by springs 42 which are connected at one end to the transverse member 38 in projections 43 and at the other to part 44 secured to the draw-bar 33. The folding wagon tongue 32 is connected to the draw-bar 33 by a projection 45 at the rear end of the part 44 and a pin 46 passing through the wagon tongue 32 and the projection 45.

Mounted beneath the tractor body 11 in front of the rear axle 13 by means of bearing brackets 47, only one being shown, is a rock-shaft 48. To the rock-shaft 48 are secured arms 49 at opposite sides of the tractor body 11, and the arms 49 are in turn connected to points of the harvester units 16 intermediate their ends by parts 50. Arm 51 secured to the rock-shaft 48 is connected to a counterbalancing spring 52, connected in turn to the tractor rear axle 13. Arm 53 secured to the rock-shaft 48 is connected to one end of a link 54, to the other end of which is connected a detent lever 55. The detent lever 55 is secured in any one of a number of positions against movement by detent mechanism, not shown, engaging an arcuate toothed plate 56 secured to the tractor.

Raising and lowering of the corn harvester 15 is effected by adjustment of the detent lever 55 which acts upon the harvester through the link 54, the arm 53, the rock-shaft 48, and the arms 49. When the corn harvester 15 is raised from the position of Figure 1, the rear end thereof moves rearwardly against the action of the springs 42 about the rock-shaft 40 as an axis. The counterbalancing spring 52 facilitates the raising.

Operation of the corn picker is in the usual way. The tractor is driven with adjacent rows of corn passing between the sets of snapping rolls 19. The snapped corn is conveyed by the elevators 21 to the husking units 18, where it is husked by the husking rolls 20. From the husking units 18 the corn passes into the chutes 27 and into the elevator conveyer 29 which elevates and discharges it into the wagon 31.

It will be apparent from the foregoing description that a new and novel mounting for a harvester upon a tractor has been devised. Although the harvester illustrated in the drawings is a corn picker, it is obvious that the novel mounting may also be used for other types of harvesters.

The intention is to limit the invention only within the scope of the appended claims.

What is claimed is:

1. In combination, a tractor having a rear axle, a supporting structure secured to the tractor to the rear of the rear axle, a harvester extending longitudinally of the tractor from the front thereof over the rear axle to the supporting structure, a rock-shaft rotatably mounted on the supporting structure at a point spaced from and to the rear of the rear axle, and an arm secured to the rock-shaft and pivotally connected with the rear end of the harvester.

2. In combination, a tractor having a rear axle, a supporting structure secured to the tractor to the rear of the rear axle, a harvester extending longitudinally of the tractor from the front thereof over the rear axle to the supporting structure, a first rock-shaft rotatably mounted on the supporting structure at a point spaced from and to the rear of the rear axle, a first arm secured to the first rock-shaft and pivotally connected with the rear end of the harvester, a second rock-shaft rotatably mounted on the tractor in front of the rear axle, and a second arm secured to the second rock-shaft and connected with a mid-point in the length of the harvester.

3. In combination, a tractor having a rear axle, a supporting structure secured to the tractor to the rear of the rear axle, a harvester extending longitudinally of the tractor from the front thereof over the rear axle to the supporting structure, a first rock-shaft rotatably mounted on the supporting structure, a first arm secured to the first rock-shaft and normally adapted to extend vertically upwardly to a connection with the rear end of the harvester, resilient means connecting the first arm and the supporting structure for maintaining the first arm in a vertical position, a second rock-shaft rotatably mounted on the tractor at a point in front of the rear axle, and a second arm secured to the second rock-shaft and normally adapted to extend horizontally forwardly to a connection with a mid-point of the harvester.

4. In combination, a tractor having a rear axle, a supporting structure secured to the tractor to the rear of the rear axle, a harvester extending longitudinally of the tractor from the front thereof over the rear axle to the supporting structure, a first rock-shaft rotatably mounted on the supporting structure, a first arm secured to the first rock-shaft and normally adapted to extend vertically upwardly to a connection with the rear end of the harvester, springs connecting the first arm and points on the supporting structure to the front and to the rear of the first rock-shaft for maintaining the first arm in a vertical position, a second rock-shaft rotatably mounted on the tractor at a point in front of the rear axle, and a second arm secured to the second rock-shaft and normally adapted to extend horizontally forwardly to a connection with a mid-point of the harvester.

5. In combination, a tractor having a rear axle, a supporting structure secured to the tractor to the rear of the rear axle, a harvester extending longitudinally of the tractor from the front thereof over the rear axle to the supporting structure, and mounting means having one pivotal connection with the supporting structure and another pivotal connection with the rear end of the harvester spaced from the said one pivotal connection, said mounting means serving to provide the rear end of the harvester with a shiftable mounting.

BENJAMIN M. HYMAN.
EDWARD M. MELIN.